United States Patent [19]
Moro

[11] Patent Number: 5,714,733
[45] Date of Patent: Feb. 3, 1998

[54] CONTROLLER AND PROGRAMMING UNIT FOR RESISTANCE WELDING AND LASER BEAM PROCESSING

[75] Inventor: Kyohji Moro, Chiba-ken, Japan

[73] Assignee: Miyachi Technos Corporation, Chiba-Ken, Japan

[21] Appl. No.: 622,141

[22] Filed: Mar. 27, 1996

[30] Foreign Application Priority Data

Mar. 29, 1995 [JP] Japan .................. 7-096091

[51] Int. Cl.⁶ .................. B23K 26/00; B23K 11/24
[52] U.S. Cl. .................. 219/121.61; 219/108; 219/110
[58] Field of Search .................. 219/108, 110, 219/121.61; 364/474.08, 477.06, 472.01, 474.01, 474.22, 474.27, 477.01

[56] References Cited

U.S. PATENT DOCUMENTS

| | | | |
|---|---|---|---|
| 4,104,724 | 8/1978 | Dix et al. | 364/477.06 |
| 4,301,351 | 11/1981 | Mathews | 219/110 |
| 4,456,809 | 6/1984 | Jones et al. | 219/108 |
| 4,458,132 | 7/1984 | Reynolds et al. | 219/114 |
| 4,490,795 | 12/1984 | Calcagno | 219/110 |
| 4,555,610 | 11/1985 | Polad et al. | 219/121.61 |
| 4,628,176 | 12/1986 | Kojima et al. | 219/110 |
| 4,717,805 | 1/1988 | Miyagawa | 219/108 |
| 4,973,814 | 11/1990 | Kojima et al. | 219/110 |
| 5,278,390 | 1/1994 | Blankenship | 219/130.5 |
| 5,444,211 | 8/1995 | Nakata et al. | 364/474.08 |

OTHER PUBLICATIONS

Legend Operator's Manual, Medar Inc., Farmington Hills, MI, Oct., 1985.

Primary Examiner—Teresa J. Walberg
Assistant Examiner—Gregory L. Mills
Attorney, Agent, or Firm—Wenderoth, Lind & Ponack

[57] ABSTRACT

To provide a resistance welding and laser beam processing controller which greatly facilitates the work of inputting (setting) welding or processing conditions for a number of schedules. Using a programming unit 10, an operator calls a schedule screen on the unit and inputs a desired value (data) of each welding condition item for any one of a plurality of welding schedules, such as, for example, schedule number "01". Then the programming unit and a main control each write the input data (setup data) into a RAM at each storage location in a storage area allocated to schedule number "01". Next, the operator calls a copy setup data screen on the programming unit, selects the welding schedule number "01" as the source, selects all the other welding schedule numbers "02" to "15" as the destination and requests copy setup data. Then the programming unit and the main control, each execute a data transfer within memory, so that within the RAM whole setup data of welding conditions for the source schedule number "01" have been copied as whole setup data of welding conditions for the destination schedule numbers "02" to "15".

8 Claims, 11 Drawing Sheets

```
[MENU]
➡CONTROL NO./DATE
➡START SW MODE
➡MODE SELECT
➡SCHEDULE
➡CURR CHANGE %
➡COPY SETUP DATA
➡MONITOR
```

[Fig. 4]

```
-SCHEDULE = 01

SQ2  WE1  COOL  WE2  HOLD  OFF
TIME     35   02   02    15   05    02   CYC
UP SLOPE      0          2                CYC
CURR          10.3       11.5             KA(STEP1)
PULSATION          |------| ×1
```

[Fig. 5]

```
-COPY SETUP DATA

SCHEDULE  01  -----> SCHEDULE  02 — 15
```

[Fig. 6]

| WELDING CONDITION \ SCHEDULE NO. | 1 | 2 | 3 | | 15 | UNIT |
|---|---|---|---|---|---|---|
| SQUEEZE TIME (SQZ) | 35 | | | | | CYCLE |
| FIRST WELDING TIME (WE1) | 2 | | | | | CYCLE |
| COOL TIME (COOL) | 2 | | | | | CYCLE |
| SECOND WELDING TIME (WE2) | 15 | | | | | CYCLE |
| HOLD TIME (HOLD) | 5 | | | | | CYCLE |
| OFF TIME (OFF) | 2 | | | | | CYCLE |
| FIRST UPSLOPE TIME (UP SLOPE 1) | 0 | | | | | CYCLE |
| SECOND UPSLOPE TIME (UP SLOPE 2) | 2 | | | | | CYCLE |
| FIRST ELECTRIC CURRENT (CURR 1) | 10.3 | | | | | kA |
| SECOND ELECTRIC CURRENT (CURR 2) | 11.5 | | | | | kA |
| PULSATION (PULSATION) | 1 | | | | | TIMES |

[Fig. 7]

| SCHEDULE NO.<br>WELDING CONDITION | 1 | 2 | 3 | | 15 | UNIT |
|---|---|---|---|---|---|---|
| SQUEEZE TIME (SQZ) | 35 | 35 | 35 | | 35 | CYCLE |
| FIRST WELDING TIME (WE1) | 2 | 2 | 2 | | 2 | CYCLE |
| COOL TIME (COOL) | 2 | 2 | 2 | | 2 | CYCLE |
| SECOND WELDING TIME (WE2) | 15 | 15 | 15 | | 15 | CYCLE |
| HOLD TIME (HOLD) | 5 | 5 | 5 | | 5 | CYCLE |
| OFF TIME (OFF) | 2 | 2 | 2 | | 2 | CYCLE |
| FIRST UPSLOPE TIME (UP SLOPE 1) | 0 | 0 | 0 | | 0 | CYCLE |
| SECOND UPSLOPE TIME (UP SLOPE 2) | 2 | 2 | 2 | | 2 | CYCLE |
| FIRST ELECTRIC CURRENT (CURR 1) | 10.3 | 10.3 | 10.3 | | 10.3 | kA |
| SECOND ELECTRIC CURRENT (CURR 2) | 11.5 | 11.5 | 11.5 | | 11.5 | kA |
| PULSATION (PULSATION) | 1 | 1 | 1 | | 1 | TIMES |

[Fig. 8]

| SCHEDULE NO.<br>WELDING CONDITION | 1 | 2 | 3 | | 15 | UNIT |
|---|---|---|---|---|---|---|
| SQUEEZE TIME (SQZ) | 35 | 35 | 35 | | 35 | CYCLE |
| FIRST WELDING TIME (WE1) | 2 | 2 | ☐3 | | 2 | CYCLE |
| COOL TIME (COOL) | 2 | 2 | 2 | | 2 | CYCLE |
| SECOND WELDING TIME (WE2) | 15 | 15 | ☐12 | | 15 | CYCLE |
| HOLD TIME (HOLD) | 5 | 5 | 5 | | 5 | CYCLE |
| OFF TIME (OFF) | 2 | 2 | 2 | | 2 | CYCLE |
| FIRST UPSLOPE TIME (UP SLOPE 1) | 0 | 0 | 0 | | ☐1 | CYCLE |
| SECOND UPSLOPE TIME (UP SLOPE 2) | 2 | 2 | 2 | | ☐1 | CYCLE |
| FIRST ELECTRIC CURRENT (CURR 1) | 10.3 | ☐9.8 | 10.3 | | ☐11.6 | kA |
| SECOND ELECTRIC CURRENT (CURR 2) | 11.5 | ☐10.0 | 11.5 | | ☐13.2 | kA |
| PULSATION (PULSATION) | 1 | 1 | 1 | | 1 | TIMES |

: DATA CHANGED

```
-COPY SETUP DATA
 SCHEDULE  01  ------>  SCHEDULE  02 - 15
      SQZ  WE1  COOL  WE2  HOLD  OFF
      UP SLOPE1   UP SLOPE2
      CURR1  CURR2
```

[Fig. 11]

| SCHEDULE NO.<br>WELDING CONDITION | 1 | 2 | 3 | | 15 | UNIT |
|---|---|---|---|---|---|---|
| SQUEEZE TIME (SQZ) | 32 | 32 | 32 | | 32 | CYCLE |
| FIRST WELDING TIME (WE1) | 2 | 2 | 3 | | 2 | CYCLE |
| COOL TIME (COOL) | 2 | 2 | 2 | | 2 | CYCLE |
| SECOND WELDING TIME (WE2) | 15 | 15 | 12 | | 15 | CYCLE |
| HOLD TIME (HOLD) | 4 | 4 | 4 | | 4 | CYCLE |
| OFF TIME (OFF) | 2 | 2 | 2 | | 2 | CYCLE |
| FIRST UPSLOPE TIME (UP SLOPE 1) | 0 | 0 | 0 | | 1 | CYCLE |
| SECOND UPSLOPE TIME (UP SLOPE 2) | 2 | 2 | 2 | | 1 | CYCLE |
| FIRST ELECTRIC CURRENT (CURR 1) | 10.3 | 9.8 | 10.3 | | 11.6 | kA |
| SECOND ELECTRIC CURRENT (CURR 2) | 11.5 | 10.0 | 11.5 | | 13.2 | kA |
| PULSATION (PULSATION) | 1 | 1 | 1 | | 1 | TIMES |

: DATA CHANGED

```
-SCH.#15      TIME  VOLT    ENERGY    WATER 28°C
 FLASH1  20.0ms  A    HIGH    999.9J
 COOL1   20.0ms       LOW     000.0J   AVERAGE
 FLASH2  20.0ms  B    MON.      0.0J    50.0W
 COOL2   20.0ms       TOTAL COUNT 12345678
 FLASH3  20.0ms  A    GOOD  COUNT  00000000
  A=500V   B=500V   200pps  9999shot  DMY=999
 HV:OFF   MAIN SHUTTER:OFF   POSITION:OFF
```

[Fig.15]

CONTROLLER AND PROGRAMMING UNIT FOR RESISTANCE WELDING AND LASER BEAM PROCESSING

BACKGROUND OF THE INVENTION

The present invention relates to a resistance welding control apparatus for controlling resistance welding which implements a plurality of welding schedules and a laser beam processing control apparatus for controlling laser beam processing which implements a plurality of processing schedules.

To facilitate operability with a wide variety of workpiece materials, shapes and qualities, and to provide an automated welding line, recent resistance welding control apparatuses have stored a plurality of different welding schedules preset with different selected values of welding conditions, and the apparatuses select appropriate welding schedules for each point to be welded to control resistance welding of the point according to the selected welding schedule.

The above-mentioned resistance welding control apparatus includes a microcomputer and has two operating modes: schedule and run modes. In the schedule mode, selected values of various welding conditions (e.g., weld time, welding current) are input for each welding schedule and stored into a memory. In the run mode, the control apparatus responds to an external control signal, a weld start signal for example, reads, from the memory, the selected values (setup data) of the welding conditions for the welding schedule specified by the control signal, and then executes resistance welding according to the setup data of the welding schedule previously read out.

With the prior art resistance welding control apparatus described above, the values of welding conditions must be selected and input for each welding schedule. Therefore, the total number of values to be selected are very numerous. For instance, eight welding conditions and fifteen welding schedules would require a total of 120 values to be selected.

In the schedule mode of the prior art apparatus, an operator must repeatedly select and input a desired value of a welding condition for each item of the welding conditions and for each welding schedule. This inputting work involves many key operations and is tedious and very time consuming for an operator to perform. Among the welding conditions, certain items, for instance, squeeze times and hold times are often set to a value which is identical or common to most welding schedules. Nevertheless, with the prior art apparatus, even for a welding condition item having a common value, the operator must repeatedly input the value data thereof for each welding schedule. Thus, the input work has very low efficiency.

The prior art laser beam processing control apparatuses that change processing conditions from one schedule to another has similar disadvantages of the input work as those in the resistance welding control apparatus.

SUMMARY OF THE INVENTION

With the above problems in mind, an object of the present invention is to provide a resistance welding or laser beam processing control which is capable of simply inputting or selecting welding conditions or processing conditions for a plurality of schedules with high efficiency.

A further object of the present invention is to provide a programming unit for resistance welding or laser beam processing in which the unit is capable of simply inputting or selecting welding or processing conditions for a plurality of schedules with high efficiency.

To achieve the foregoing objects, a resistance welding control apparatus of the present invention controls resistance welding with a plurality of welding schedules and comprises:

input means for inputting selected values of welding conditions for each welding schedule;

storage means for storing the selected values of welding conditions for each welding schedule; and copying means for copying, within said storage means, part or whole of the selected values of welding conditions for any one of the welding schedules to corresponding part or whole of the selected values of welding conditions for a different one or ones of the welding schedules.

A resistance welding programming unit of the invention inputs welding conditions to a main resistance welding control via a communication interface and comprises:

display means for displaying characters and/or graphics representative of the welding conditions;

cursor key means for moving a screen cursor on a screen of the display means;

data input key means for inputting a selected value of a welding condition item pointed to by the screen cursor;

storage means for storing selected values of welding conditions for each of a plurality of welding schedules; and copying means for copying, within the storage means, part or whole of the selected values of welding conditions for any one of the welding schedules to corresponding part or whole of the selected values of welding conditions for a different one or ones of the welding schedules.

A laser beam processing control of the invention controls laser beam processing with a plurality of processing schedules and comprises:

input means for inputting selected values of processing conditions for each of the processing schedules;

storage means for storing the selected values of processing conditions for each of the processing schedules; and copying means for copying, within the storage means, part or whole of the selected values of processing conditions for any one of the processing schedules to corresponding part or whole of the selected value of processing conditions for a different one or ones of the processing schedules.

A laser beam processing programming unit of the invention inputs processing conditions to a main laser beam processing control via a communication interface and comprises:

for displaying characters and/or graphics representative of the processing conditions;

cursor key means for moving a screen cursor on a screen of the display means;

data input key means for inputting a selected value of a processing condition item pointed to by the screen cursor;

storage means for storing selected values of processing conditions for each of a plurality of processing schedules; and copying means for copying, within the storage means, part or whole of the selected values of processing conditions for any one of the processing schedules to corresponding part or whole of the selected values of processing conditions for a different one or ones of the processing schedules.

In accordance with the invention, first the input means (or display means, cursor key means and data input key means) inputs selected values of welding or processing conditions for any one of the welding or processing schedules. The selected values of welding or processing conditions are stored into predetermined storage locations of the storage means. Then the copying means operates to copy, within the storage means, part or whole of the selected values of welding or processing conditions for the one of the welding or processing schedule (source schedule) to corresponding part or whole of the selected values of welding or processing conditions for a different one or ones of the welding or processing schedules (destination schedules). Thus with respect to a welding or processing condition item having a selected value common to a source schedule and destination schedule or schedules, the input operation of data of that condition item may be done for the source schedule only and no input operation is required for other or destination schedules.

BRIEF DESCRIPTION OF THE DRAWINGS

The above and other objects and advantages of the invention will become more apparent from the following description taken in conjunction with the drawings in which.

DETAILED DESCRIPTION OF PREFERRED EMBODIMENTS

Figure 1:
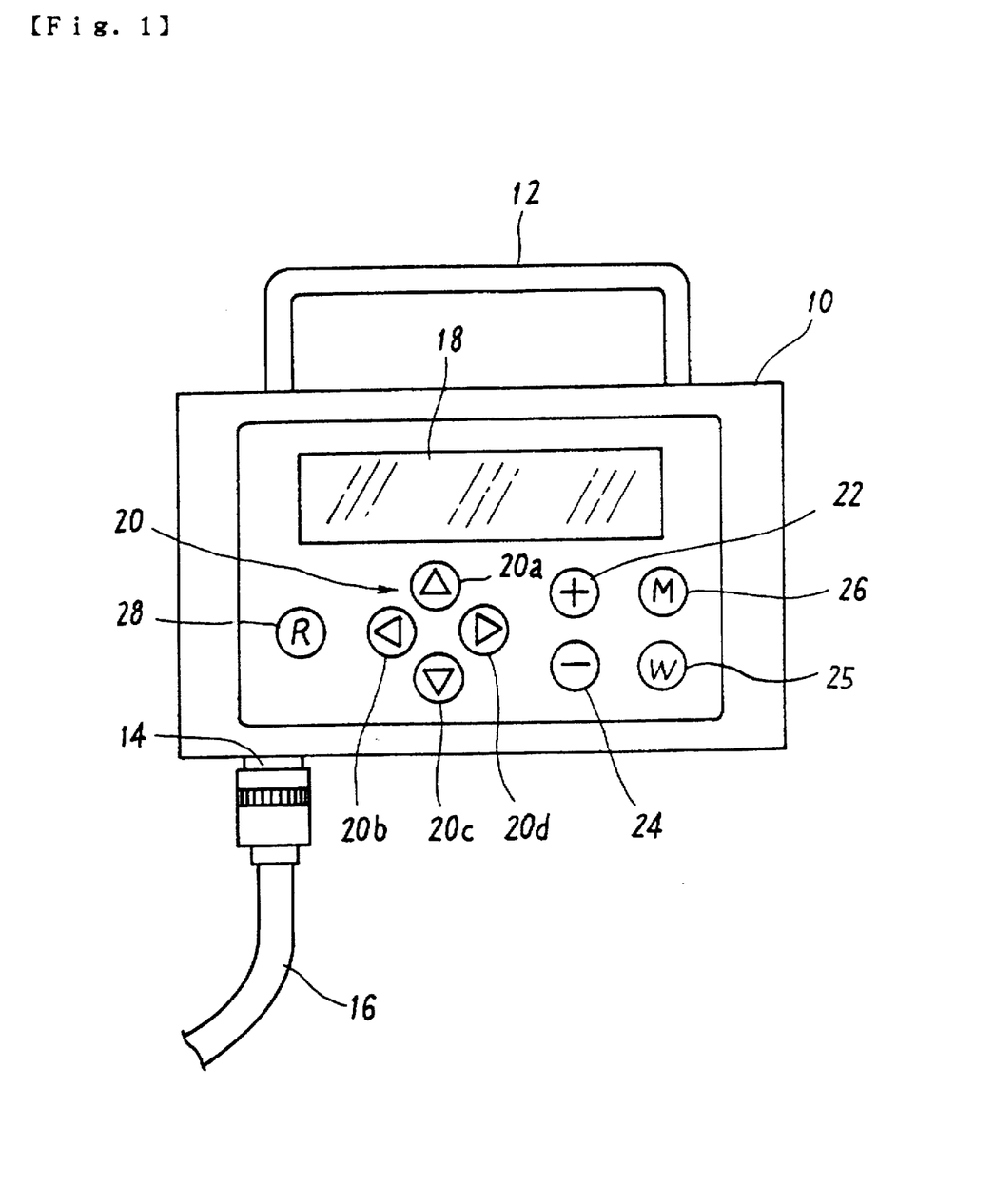
FIG. 1 is a front view of one embodiment of a programming unit for use in a resistance welding control apparatus in accordance with the invention.

One embodiment of the invention will be described with reference to FIGS. 1 to 11. FIG. 1 is an external view of a resistance welding programming unit 10 for use in a resistance welding control apparatus of the embodiment.

The programming unit 10 is portable and has a handle 12 at the top and a communication connector 14 at the bottom. One end of a communication cable 16 is detachably connected to the communication connector 14. The other end of the communication cable 16 is detachably connected to a main or host resistance welding control 50 which will be described later.

A flat panel display, such as a liquid crystal display 18, is disposed above the center of the front panel of the programming unit 10. Disposed below the flat panel display 18 are keys 20 to 28. The keys include cursor keys 20 (20a to 20d), an increment key 22, a decrement key 24, a write key 25, a menu key 26 and a trouble reset key 28.

Cursor keys 20 (20a to 20d) are used to move a screen cursor from one item to another on display screen of the display 18. Upon depressing one of the cursor keys 20a-20d, the screen cursor is moved in the direction of the arrow indicated on the key.

The increment 22 and decrement 24 keys define a data input key means. A value of a selected item, pointed to by the screen cursor, is incremented one by one in response to each depressing action of the increment key 22, or decremented one by one in response to each depressing action of the decrement key 24.

The write key 25 is depressed for the programming unit 10 to determine or accept data input by the increment 22 or decrement 24 key as a selected value or an input command. The menu key 26 is used to call a menu screen. The trouble reset key 28 is used to release a trouble screen displayed at the occurrence of trouble.

Figure 2:
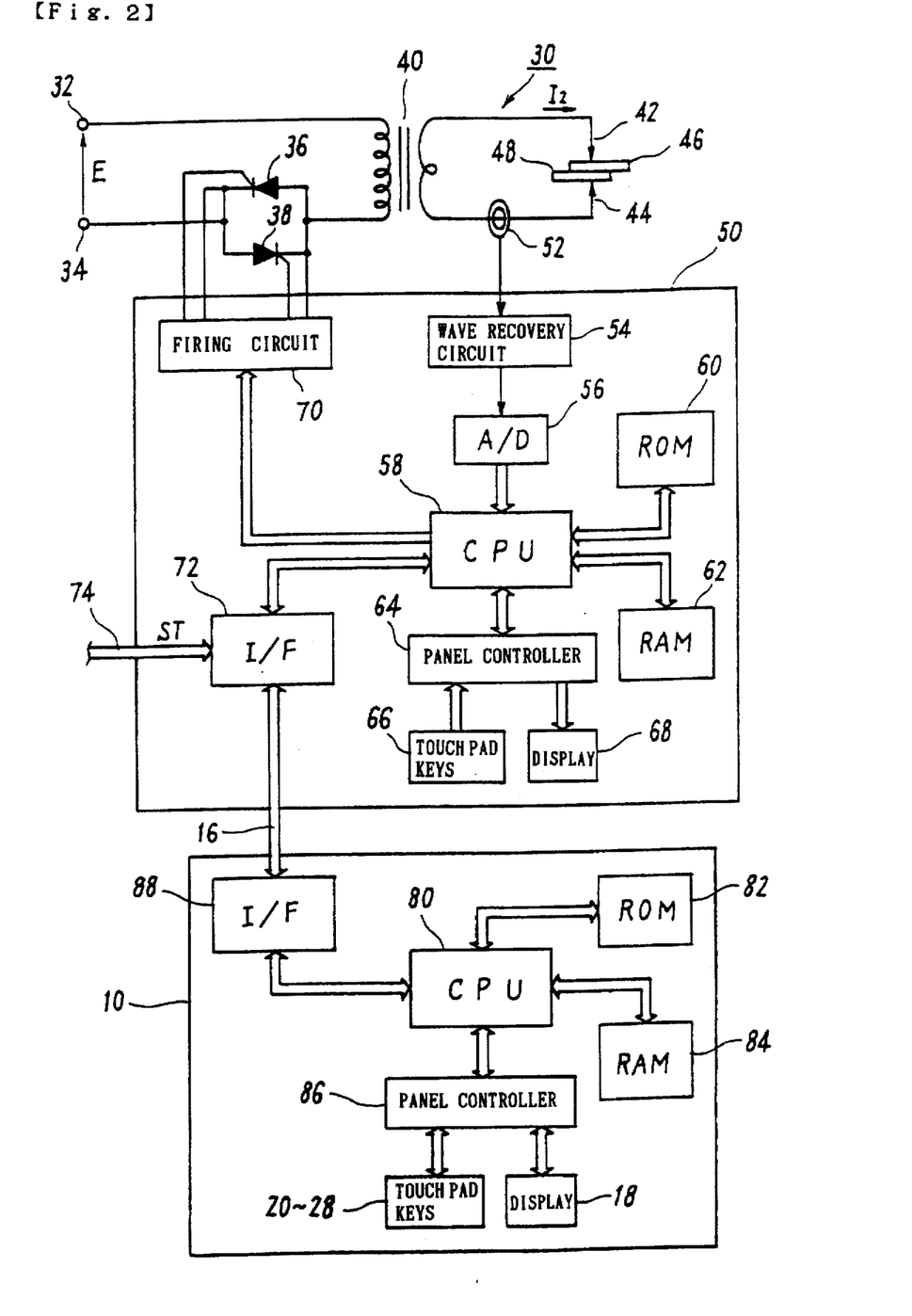
FIG. 2 is a block diagram of a resistance welding system incorporating the resistance welding control apparatus in accordance with the invention.

FIG. 2 shows a resistance welding system of the embodiment. The resistance welding system comprises a resistance welding machine 30 that performs resistance welding, a main resistance welding control 50 that controls resistance welding of the resistance welding machine 30 and the programming unit 10 that is placed at a remote site from the main control 50. The programming unit 10 inputs selected values of welding conditions to the main control 50.

In the resistance welding machine 30, a commercial AC supply voltage E is received by input terminals 32 and 34 and then supplied to the primary coil of a welding transformer 40 via a pair of thyristors 36 and 38 which serve as a contactor. An AC induction electromotive force (secondary voltage) induced in the secondary coil of the welding transformer 40 is applied across workpieces 46 and 48 via secondary conductors and a pair of welding electrodes 42 and 44 so that an AC welding current $I_2$ may flow through the secondary circuit. The magnitude (effective value) of the welding current $I_2$ is controlled by controlling the firing angle of the thyristors 36 and 38 which are controlled by a firing circuit 70-in the main control 50.

The main control 50 comprises a current sensor (e.g., troidal coil) 52, a wave recovery circuit 54 with an integrating circuit, an analog-to-digital converter 56, a CPU 58, a ROM 60, a RAM 62, a panel controller 64, touch pad keys 66, a display 68, the firing circuit 70 and an interface circuit 72.

The combination of the troidal coil 52, the wave recovery circuit 54, the analog-to-digital converter 56, the CPU 58 and the firing circuit 70 constitutes a closed-loop constant current control circuit. When welding current 12 flows in the resistance welding machine 30, the troidal coil 52 outputs a voltage having a waveform derivative of the welding current 12 waveform. The wave recovery circuit 54, which includes an integrator circuit, outputs a voltage signal (welding current detection signal) representing the waveform of the welding current $I_2$. The welding current signal from the wave recovery circuit 54 is converted, by the analog-to-digital converter 56, into a corresponding digital signal which is then supplied to CPU 58. CPU 58 compares the welding current signal (measured value) with the selected value thereof to compute the error therebetween. The CPU 58 supplies a firing angle control signal to the firing circuit 70 in such a manner that the error will be cancelled. The firing circuit 70 turns on (fires) the thyristors 36 and 38 at a firing angle according to the firing angle control signal from CPU 58. With the closed-loop constant-current control, the welding current $I_2$ is maintained near the selected value.

ROM 60 stores programs including a control program for providing the constant-current control stated above, a control program for providing selected value (schedule data) copying function (to be described), a communication control program for data communication with the programming unit 10, a display program for providing a man-machine interface on the front panel, and a program of a key input routine. According to the programs stored in ROM 60, CPU 58 executes necessary computations and controls respective components of the main control 50.

RAM 62 stores selected values of welding conditions, measured values thereof, and intermediate and final computed data. The contents of RAM 62 are held by a backup battery. The panel controller 64 provides an interface between CPU 58, and keys 66 and display device 68 (including liquid crystal display or LED indicators) disposed on the front panel.

The interface circuit 72 is connected to the CPU 58 via an internal bus and is also connected to a communication interface circuit 88 in the programming unit 10 via the communication cable 16. The interface circuit 72 is further connected to an external welding robot controller or weld start switch (not shown) via a cable 74.

The cable 74 carries a weld start signal ST. This signal ST specifies a desired welding schedule number. Upon receipt of 4 weld start signal ST via the interface circuit 72, the CPU 58 reads, from RAM 62, selected values of the welding conditions (e.g., squeeze time, weld time, welding current) for the welding schedule number specified by the weld start signal 57. Then CPU 58 controls the resistance welding machine 30 to perform resistance welding according to the selected values of the welding conditions read out. In the present embodiment, fifteen welding schedules (with schedule numbers of "01" to "15") may be programmed.

The interface circuit 72 provides a communication interface for data communication with the programming unit 10, such as the modem interface function for RS-232C or RS-422, for example. The interface circuit 72 comprises a communication integrated circuit for transmitting and receiving, a driver/receiver, etc.

The programming unit 10 comprises a CPU 80, a ROM 82, a RAM 84, a panel controller 86 and a communication interface circuit 88.

The ROM 82 stores programs including a control program for providing a selected value (schedule data) copying function, a communication control program for data communication with the main control 50, a display program for providing a man-machine interface on the front panel and a program of a key input routine. According to the programs stored in the ROM 82, CPU 80 executes necessary computations and controls respective components of the programming unit 10.

The RAM 84 stores selected values of welding conditions, measured values, and intermediate and final computed data from CPU 80. The panel controller 86 provides an interface between CPU 80 and the front panel, supplies a key input signal from the keys 20 to 28 to CPU 80 and controls the display (liquid crystal display) 18 to display data from CPU 80.

The communication interface circuit 88 provides a communication interface for data communication with the main control 50, such as the modem interface functions for RS-232C or RS-422, for example. The communication interface circuit comprises a communication integrated circuit for transmitting and receiving a driver/receiver, etc.

Figure 3:
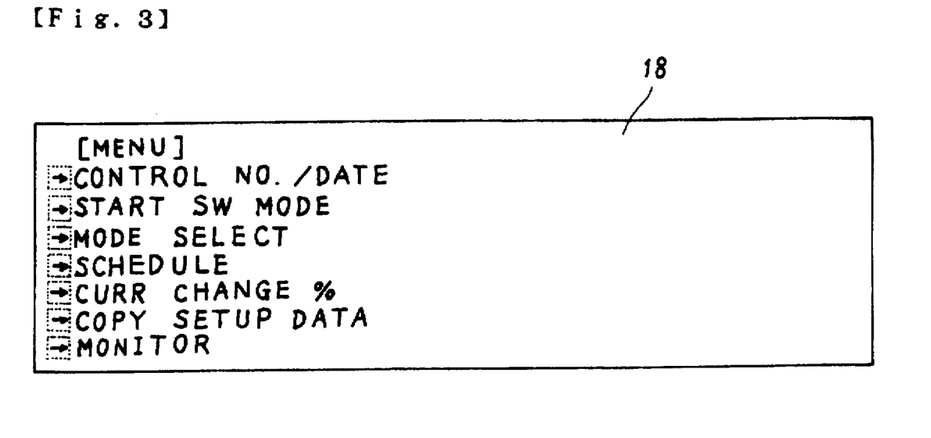
FIG. 3 is a view of a menu screen displayed on the programming unit.
Figure 4:
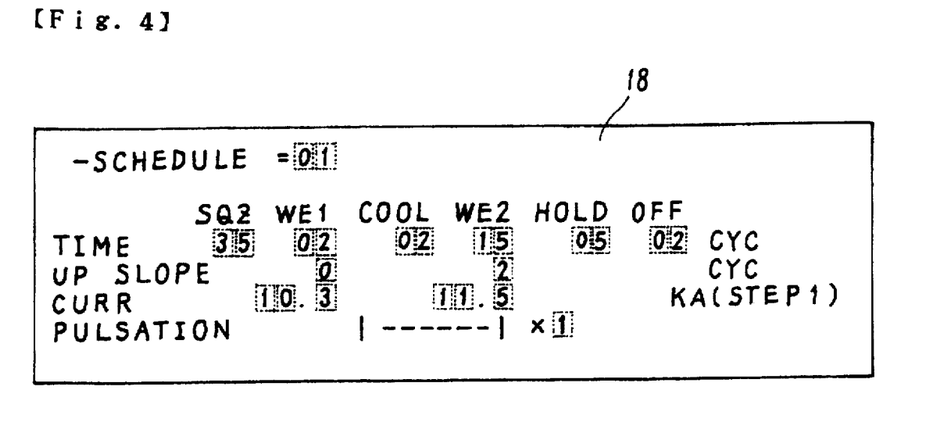
FIG. 4 is a view of a schedule screen displayed on the programming unit.
Figure 5:
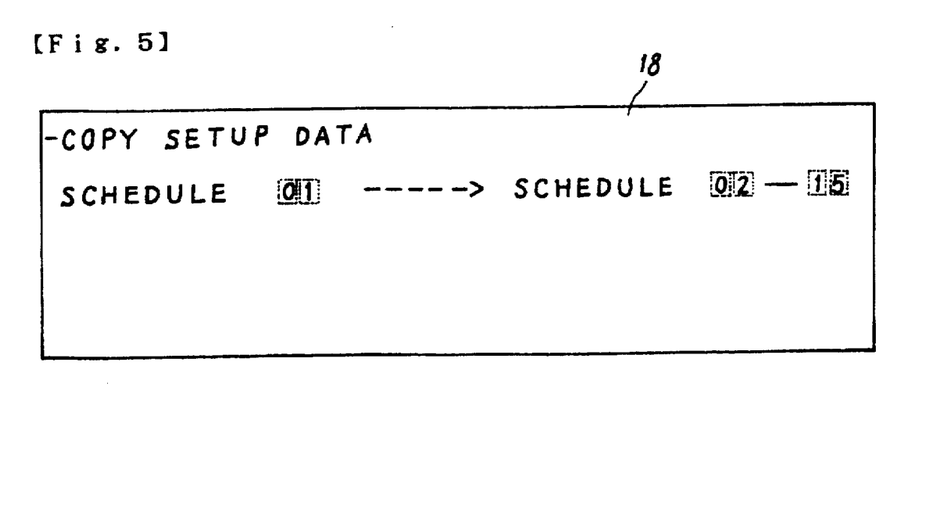
FIG. 5 is a view of a copy setup data screen displayed on the programming unit.

FIGS. 3 to 5 are views of a screen (visual presentation) displayed on the liquid crystal display panel 18 of the programming unit 10. When the menu key 26 is depressed, a menu screen as shown in FIG. 3 is displayed. The menu screen provides a list of available screens other than menu screen. The cursor keys 20a to 20d operate so as to move the screen cursor to point to a desired item, for example "schedule." The write key 25 operation causes the display panel 18 to display a schedule screen such as the one shown in FIG. 4.

In the schedule screen, a operator may select and enter desired welding conditions for each welding schedule. First, a schedule number is input to the first line of the schedule screen. Then each setting items (welding condition) squeeze time (SQZ), first weld time (WE1), cool time (COOL), second weld time (WE2), hold time (HOLD), off time (OFF) are selected by positioning the screen cursor. The welding condition item is set to a desired value by operating the increment 22 or decrement 24 keys. Finally, the write key 25 is depressed.

In response to the depressing of the write key 25, the programming unit 10 updates the selected value of the item stored in memory (RAM 84) to the one (newly selected data) displayed at the screen cursor position and sends the newly selected data to the main control 50 via the communication interface 88. Then the main control 50 updates the selected value of the item stored in memory (RAM 62) as the received data.

When an item "copy setup data" is selected from the menu screen, a copy setup data screen as shown in FIG. 5 is presented on the display panel 18. In the copy setup data screen, selected values of welding conditions for any one of the welding schedules may be copied to corresponding selected values of welding conditions for a different one or ones of the welding schedules.

In FIG. 5, a left item "schedule" is set to a source schedule number, whereas a right item "schedule" is set to destination schedule number of numbers. In the example shown in FIG. 5, the source schedule is schedule number "01", whereas the destination schedules are schedule numbers "02" to "15". A single destination schedule may be selected by inputting number of that schedule twice (e.g., "02" and "02" for the schedule number "02").

The cursor keys 20 operate so as to move the screen cursor to the item of source schedule and to the item of destination schedules). The increment 22 and decrement 24 keys operates so as to set desired welding schedule numbers of the source and destination schedules. Finally, the write key 25 is depressed to copy the selected values according to the settings of the screen.

Operation of the present resistance welding control apparatus will now be described for the welding schedule data inputting process and the schedule data copying process with reference to FIGS. 4 to 9.

First, an operator operates keys to call the schedule screen on the display panel 18 of the programming unit 10. In the schedule screen, the operator selects and inputs a desired welding schedule number of, for example, "01", and then inputs a desired value of each welding condition item, such as the squeeze time (SQZ), the first weld time (WE1), the cool time (COOL), the second weld time (WE2), etc., for the welding schedule number "2".

Figure 6:
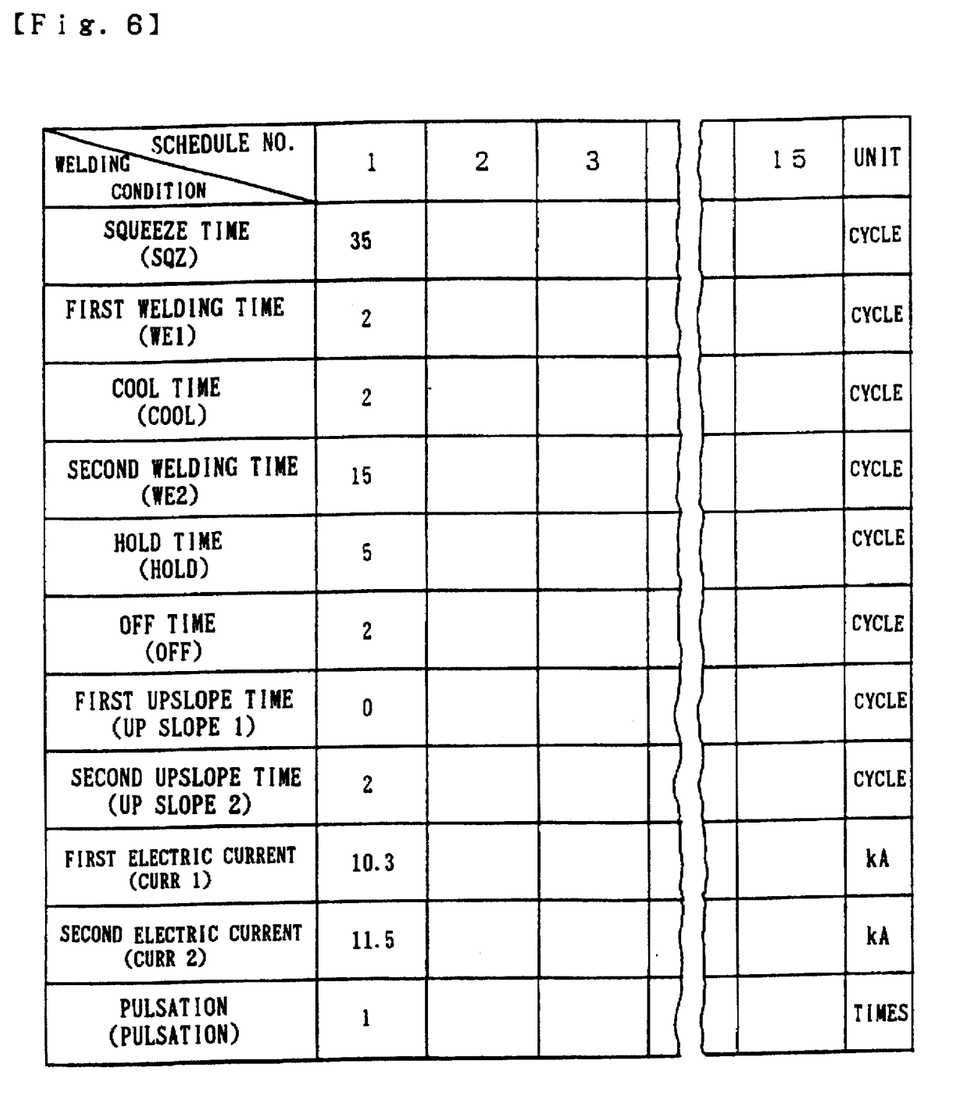
FIGS. 6 to 8 schematically show a schedule memory to illustrate how data is inputted and copied.

Then, the programming unit 10 and the main control 50 write the input value of each welding condition into the RAM 84 and the RAM 62, respectively, at each storage location in a storage area A1 allocated to the welding schedule number "01" as schematically shown in FIG. 6.

Next, operating the keys as described, the operator calls the copy setup data screen on the display panel 18 of the programming unit 10, selects the welding schedule number "01" as the source schedule, selects the other welding schedule numbers "02" to "15" as the destination schedules and requests a schedule data copying process.

Figure 9:
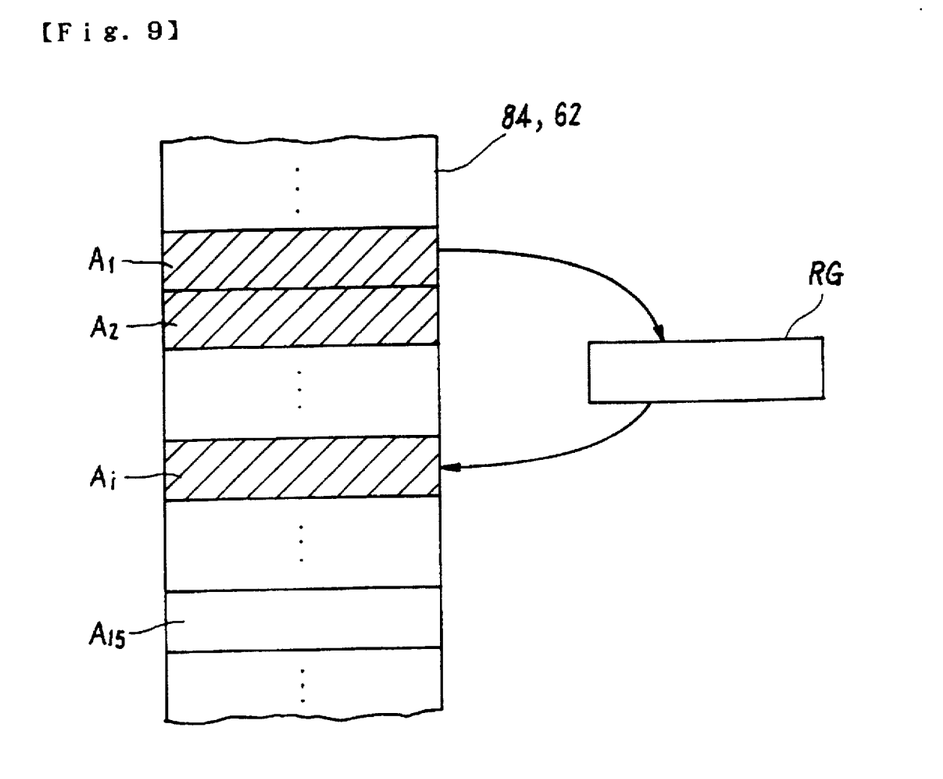
FIG. 9 shows how data is transferred within the schedule memory during the setup data copying process.

Then the programming unit 10 and the main control 50 reach execute a data transfer within memory. Specifically, within RAM 84 and RAM 62, data (welding condition values) is block-transferred from the area $A_1$ of the source schedule number 1 to the areas $A_2$ to $A_{15}$ allocated to "02" to destination welding schedule numbers "02" to "15", respectively, via a register RG within CPU 80, and CPU 58, as shown in FIG. 9. The block transfer is carried out by repeatedly executing a one word transfer instruction from an address in the source schedule data storage area $A_1$ to the register RG and a one word transfer instruction from the register RG to a corresponding address in the destination schedule data storage area $A_1$.

Figure 7:
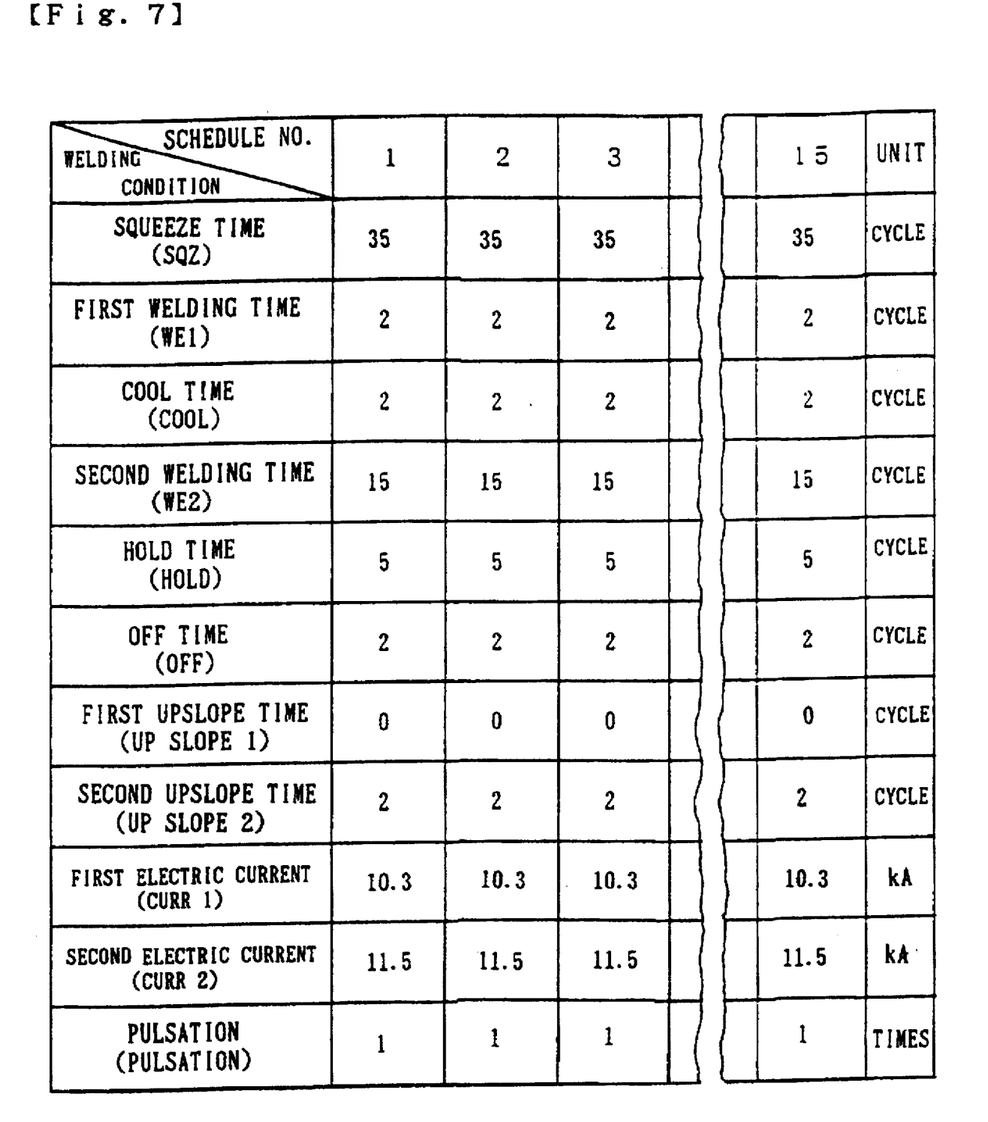

As a result, within each memory of RAM 84, the welding condition values for the source welding schedule number "01" have been copied to all welding condition values for the destination welding schedule numbers "02" to "15".

Figure 8:
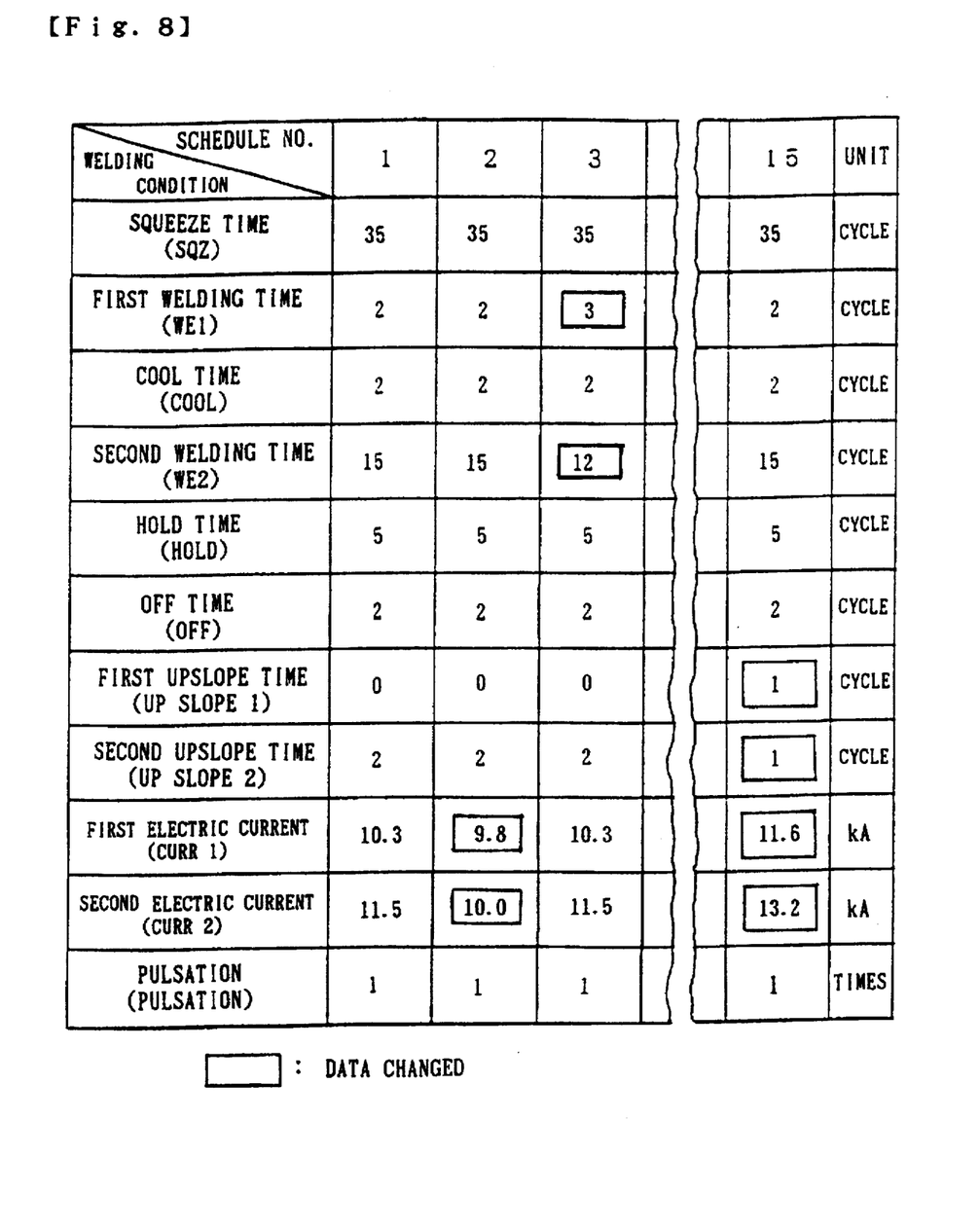

Next the operator calls the schedule screen on the display panel 18 of the programming unit 10, selects a destination welding schedule number of, for example, "02" and inputs a selected value with respect to only those welding condition items: e.g., first current (CURR1) and second current (CURR2) of schedule number "02" which should have a different value from the welding condition value for the source welding schedule number "01".

With respect to the other welding condition items: i.e., the squeeze time (SQ2), the first weld time (WE1), the cool time (COOL), the second weld time (WE2), the hold time (HOLD), the off time (OFF), the first upslope time (UP SLOPE 1) and the second upslope time (UP SLOPE 2), each selected value thereof for schedule number 2 has been obtained by copying the schedule data of the source schedule number "01". Thus for these welding condition items, no input work (key operations) is required on the part of the operator.

For other destination welding schedule numbers "03" to "15" only the welding condition items which should have a different value from that of the source welding schedule number "01" are changed to a desired value by key operations.

The selected value copying function (copy setup data function) of the present resistance welding control apparatus copies the selected value of each welding condition for any one of the welding schedules to the selected value of each corresponding welding condition for a different one or ones of the welding schedules. Thus with respect to a welding condition having a common value to all of the welding schedules, a data input operation is required for a single welding schedule only, thus eliminating the need for inputting data of the other welding schedules so that the input work on the part of the operator is greatly reduced and simplified.

The selected value copying function has an advantageous effect even on a welding condition item which should be set for each welding schedule, since the welding condition item generally has a similar value for a plurality of welding schedules. For example, when the first current (CURR1) of the welding schedule number 2 is to be set to a desired value such as "9.8", that item has already been set by the selected value copying function to be "10.3" kA which is a copy of the first current (CURR1) from source welding schedule number "01". Thus, the operator needs only to depresses the decrement key 24 so as to change "10.3" kA to "9.8" kA. This operation of the key 24 for changing to "10.3" kA to "9.8" kA can be done in a much shorter time and with a smaller number of key strokes than would be required for obtaining "9.8" kA from an initial value of "00.0" kA.

The copy setup data function copies all the selected values of the welding conditions for any one of the welding schedules to all selected values of the welding conditions for a different welding schedule or schedules. A modified copy setup data function may copy part of the selected values of the welding conditions for any one of the welding schedules to the corresponding part of the selected values of the welding conditions for a different welding schedule or schedules.

Figure 10:
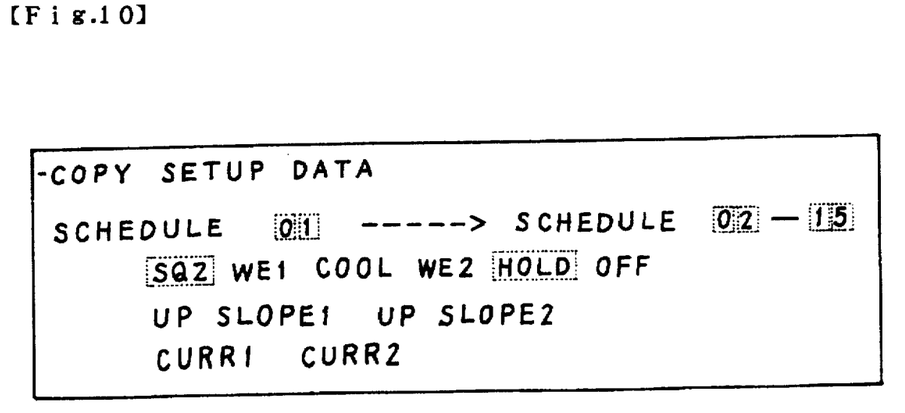
FIG. 10 is a view of a copy setup data screen displayed on a modified programming unit in accordance with the invention.

FIG. 10 is a view of a copy setup data screen in accordance with the modified (partial) setup data copying function. From the copy setup data screen, an operator selects, with cursor keys 20 and the write key 25, welding condition items to be copied. The selected welding condition items may be marked by an inverted display thereof.

The partial setup data copying function is useful for the case when partial selected values, in particular those which should be common to a plurality of welding schedules, conditions have been input for all welding schedules.

For instance, in the example shown in FIG. 8, when only the squeeze time (SQZ) value and hold time (HOLD) value are to be changed, first the squeeze time (SQZ) value and hold time (HOLD) value for a welding schedule number, say, "01" are updated to desired values of, say, 32 (cycles) and 4 (cycles), respectively, by key operations in accordance with the schedule function.

Figure 11:
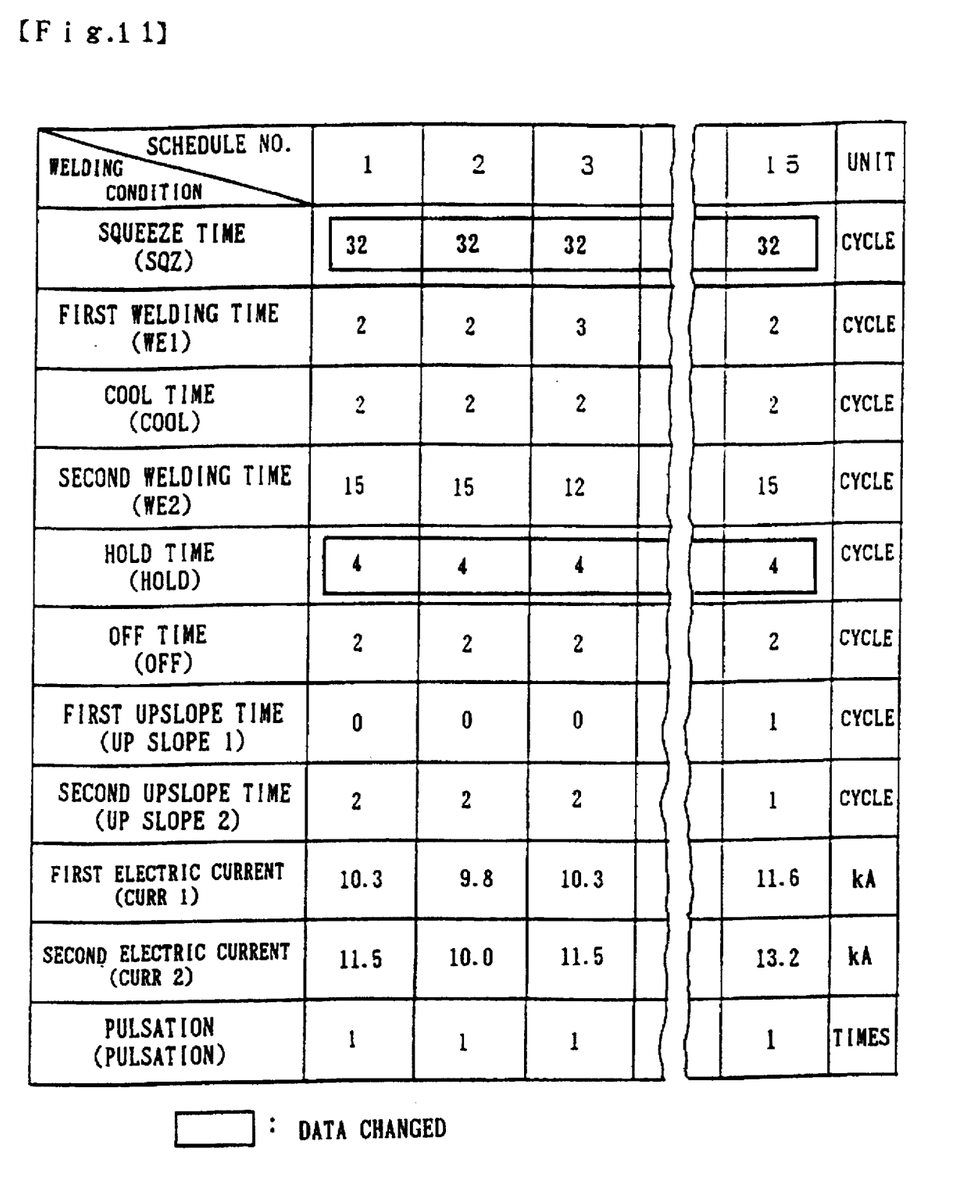
FIG. 11 schematically shows a schedule memory in the modified embodiment of the invention to illustrate how data is inputted and copied.

Next, in accordance with the partial setup data copying function, the operator selects the welding condition items of the squeeze time (SQZ) and hold time (HOLD) and requests a partial setup data copying process from welding schedule number "01" to the welding schedule numbers "02" to "15".

Then, each of the programming unit 10 and the main control 50 executes the partial setup data copying process so that, within each memory of RAM 84 and RAM 62, the squeeze time (SQZ) value and hold time (HOLD) value for schedule numbers "02" to "15" are changed to "32" cycles and "4" cycles, respectively. Thus no input operation on the schedule screen is required for welding schedule numbers "02" to "15" so that the input work on the part of the operator is greatly reduced and simplified.

In the above embodiment, the portable programming unit 10 is connected to the main control 50 via the communication interface. Thus, the operator can input or set welding conditions for respective welding schedules to the main control 50 from the programming unit 10 at a remote site.

The above embodiment may be modified, however, such that the main control 50 includes the same, panel function as that of the programming unit 10 to allow direct inputting or setting of data and the direct requesting of the setup data copying function from the panel of the main control 50.

The above embodiment is directed to a (alternating current) resistance welding machine, however, the present invention can also be applied to resistance welding control apparatuses of other types.

Figure 12:
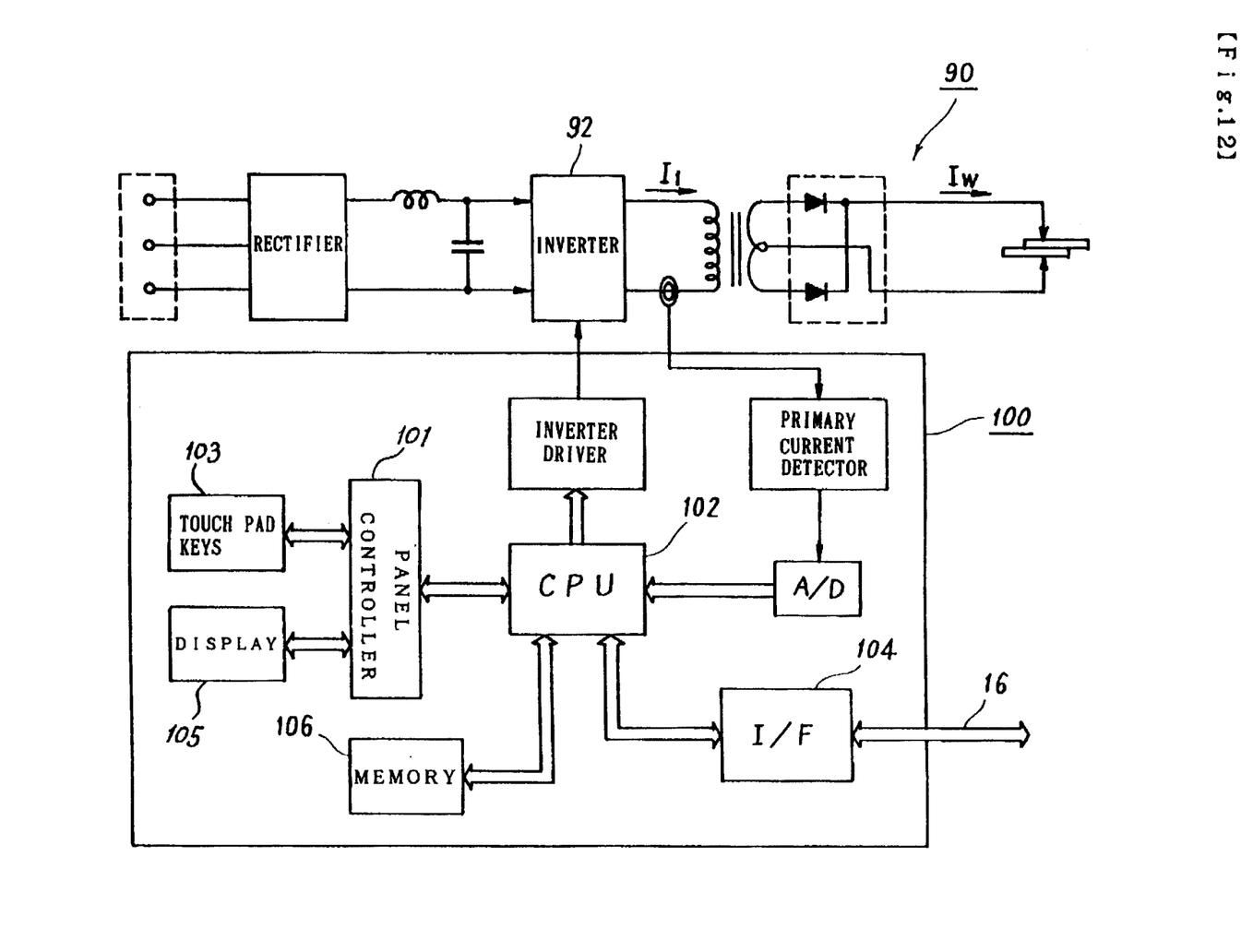
FIG. 12 is a block diagram of an inverter resistance welding system incorporating a modified embodiment of a main resistance welding control in accordance with the invention.

For example, the invention can be applied to a resistance welding control apparatus for controlling an inverter resistance welding machine 90, as shown in FIG. 12. The main control 100 may include a function which allows the direct inputting of data and the direct requesting of a setup data copying function from the panel (101, 103, 105) thereof. In the alternative, CPU 102 in the main control 100 may be connected to a communication interface circuit 104 via an internal bus. The communication interface circuit 104 may be connected to a communication interface 88 in the programming unit 10 via a communication cable 16 so that setup data and a request for copying may be input to the main control 100 from the programming unit 10 in the manner as described for the above embodiment.

The main control 100 controls the switching of an inverter circuit 92 to control the effective value or waveform of a DC welding current $I_w$ according to programs and welding condition data stored in memory 106.

The screens (visual presentations) displayed on the display panel 105, 18 in the main control 100 or the programming unit 10, welding condition items and contents thereof may be modified for the inverter resistance welding machine.

Figure 13:
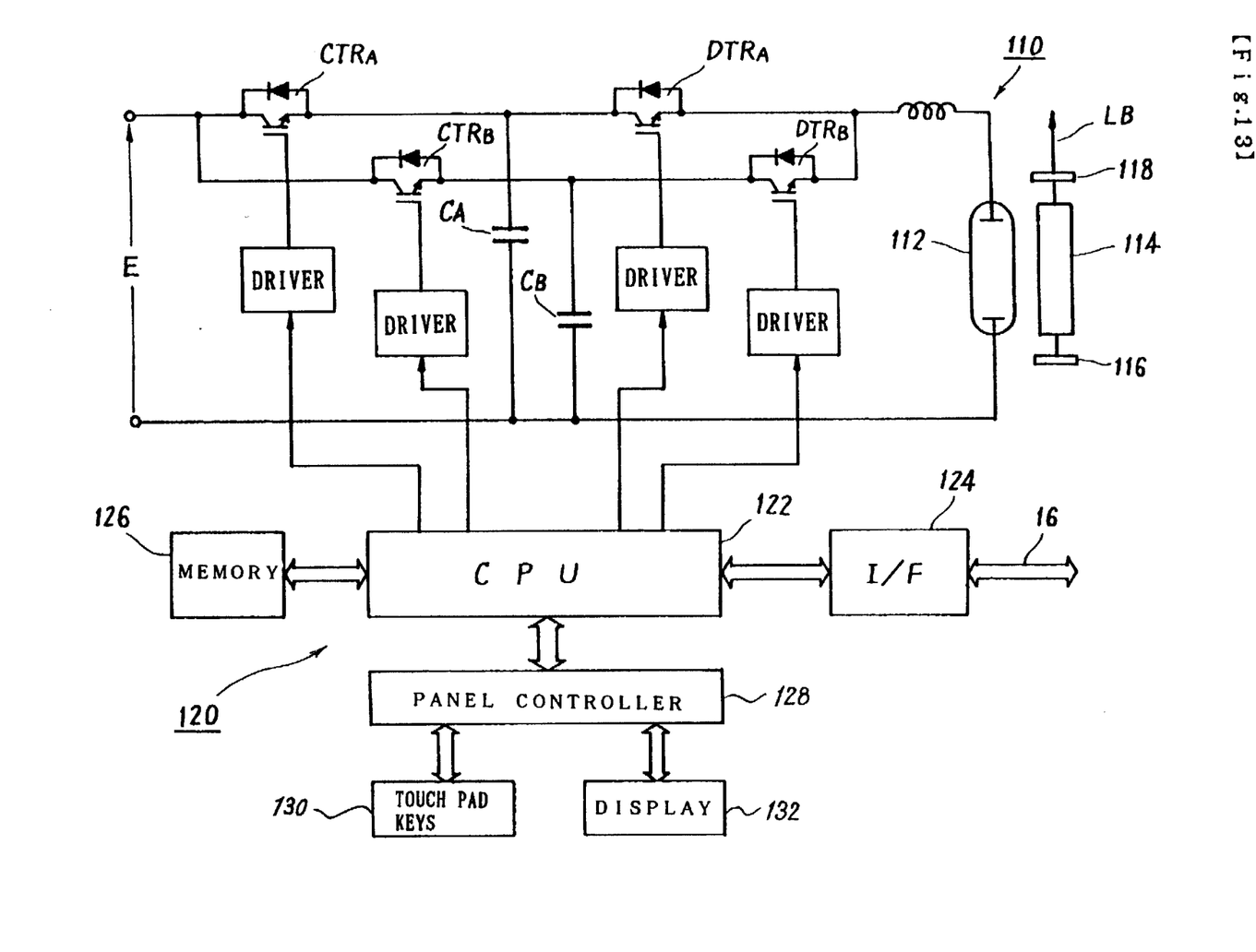
FIG. 13 is a block diagram of a YAG laser beam processing system incorporating an embodiment of a main laser beam processing control in accordance with the invention.

The present invention can also be applied to a control apparatus for controlling a laser beam processing apparatus, for example, such as a yttrium-aluminum-garnet (YAG) laser beam processing apparatus 110, as shown in FIG. 13. As in the above embodiment, the CPU 122 in a main laser beam processing control 120 may be connected through an internal bus to the communication interface circuit 124 which may be connected to the communication interface circuit 88 in the programming unit 10 via the communication cable 16.

In an electric power supply of the YAG laser beam processing apparatus 110, a pair of capacitor banks $C_A$ and $C_B$ are connected in parallel to a laser excitation lamp 112. The capacitor banks $C_A$ and $C_B$ are independently charged and discharged at proper times to supply the electric power to the laser excitation lamp 112. When supplied with the electric power, the laser excitation lamp emits light which excites a YAG rod 114 so as to emit light from both end faces thereof. The light from the YAG rod 114 is amplified by an optical resonator of a total reflector mirror 116 and an output mirror 118 into a laser beam LB which is then output from the output mirror 118.

In the main laser beam processing control 120, the CPU 122 controls switching of charging transistors $CTR_A$ and $CTR_B$ and discharging transistors $DTR_A$ and $DTR_B$ according to programs and welding condition data stored in the memory 126 to thereby control electric power supply to the laser excitation lamp 112 and the laser beam output.

The screens (visual presentations) displayed on the display panel 132, 18 in the main control 120 or the programming unit 10, welding condition items, and contents thereof may be modified for the required laser beam processing.

Figure 14:
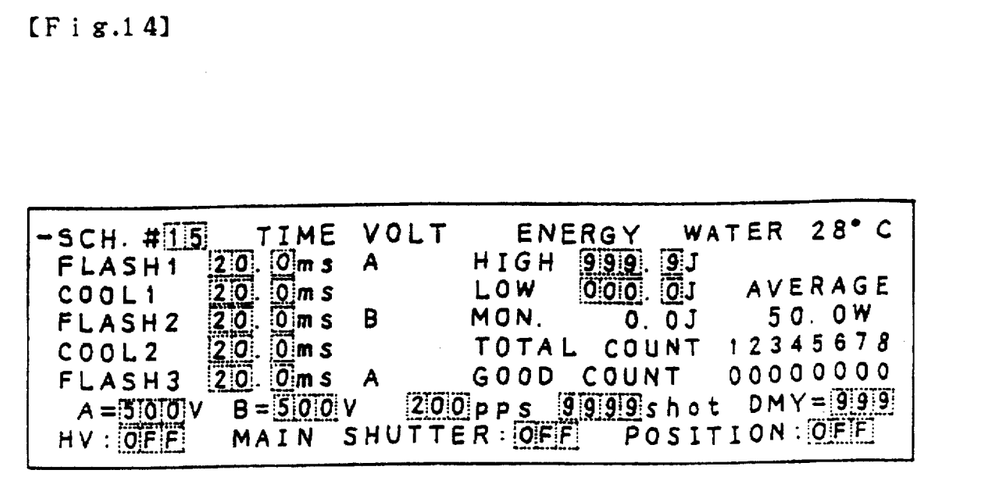
FIG. 14 is a view of a schedule screen displayed on a programming unit in the laser beam processing system.
Figure 15:
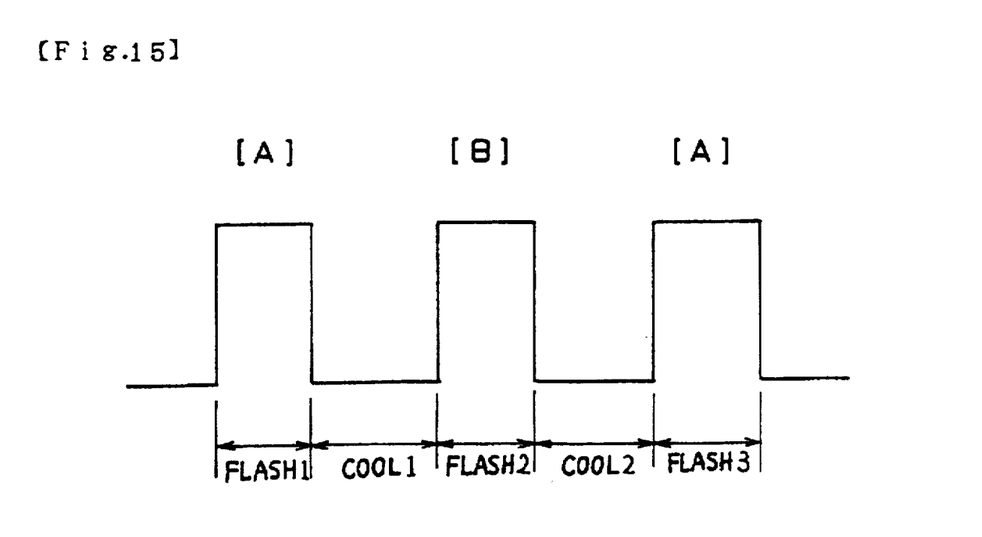
FIG. 15 is a time, chart of an on/off state of a laser excitation lamp in which respective time intervals are set up in the schedule screen in FIG. 14.

FIG. 14 is a view of a schedule screen displayed on the display panel 132 or 18. The schedule screen shown in FIG. 14 includes the processing condition items together with their values for the laser beam processing schedule number 15. Among the processing condition items, items of "FLASH 1", "COOL 1", "FLASH 2", "COOL 2", and "FLASH 3" correspond to respective time intervals of the excitation lamp on/off state time chart shown in FIG. 15. Items "A" and "B" refer to capacitor banks $C_A$ and $C_B$, respectively. Item "A=500V" means that the charged voltage across the capacitor bank $C_A$ has been set to 500 volts. Items "HIGH" and "LOW" refer to upper and lower limits of the laser beam power, respectively.

The data transfer from the programming unit 10 to the main control may be performed in any suitable format. Data input by the increment key 22 or decrement key 24 to the programming unit 10 may be directly transferred to the main control or may be converted into another form before the data is transferred to the main control.

The cursor key means and the data input key means of the invention are not restricted to the push-button keys 20, 22 and 24 of the above embodiment, but may be implemented with any suitable input device. In the above embodiment, the write key 25 is depressed to determine the data pointed to by the screen cursor on the display screen, however, the write key 25 may be omitted if the apparatus is able to otherwise determine the data in response to either depressing or releasing of the data input keys 22 and 24.

The display means is not restricted to a flat panel display but may be implemented by, for example, an LED display devices. The information displayed by the display means includes any suitable visual information such as characters, graphics and the like.

Therefore, the resistance welding or laser beam processing control apparatus of the invention greatly simplifies the input operations for inputting or setting values of welding or laser beam processing conditions for a plurality of schedules. A similar effect is produced by the programming unit of the invention at a remote site by using a data communication function thereof.

What is claimed is:

1. A resistance welding controller operable to control resistance welding in accordance with a plurality of welding schedules which contain welding conditions, said controller comprising:

an input means for inputting values of the welding conditions for each welding schedule;

a storage means for storing the values of the welding conditions for each welding schedule;

a source schedule selecting means for selecting one of the plurality of welding schedules to be a source welding schedule;

a destination schedule selecting means for selecting a plurality of the welding schedules, other than the source welding schedule, to be destination schedules; and a copying means for simultaneously copying, within said storage means, the values of the welding conditions of the source welding schedule to be the values of corresponding welding conditions of each destination schedule.

2. A resistance welding programming unit operable to input welding conditions, contained in a plurality of welding schedules, into a resistance welding controller through the use of a communications interface, said programming unit comprising:

a display means for displaying a screen cursor and the welding conditions;

a cursor key means for moving the screen cursor displayed on said display means;

a data input key means for inputting values of welding conditions designated by the screen cursor;

a storage means for storing the values of the welding conditions for each welding schedule;

a source schedule selecting means for selecting one of the plurality of welding schedules to be a source welding schedule;

a destination schedule selecting means for selecting a plurality of the welding schedules, other than the source welding schedule, to be destination schedules; and a copying means for simultaneously copying, within said storage means, the values of the welding conditions of the source welding schedule to be the values of corresponding welding conditions of each destination schedule.

3. A laser beam processing controller operable to control processing of a laser beam in accordance with a plurality of processing schedules which contain processing conditions, said controller comprising:

an input means for inputting values of the processing conditions for each processing schedule;

a storage means for storing the values of the processing conditions for each processing schedule;

a source schedule selecting means for selecting one of the plurality of processing schedules to be a source processing schedule;

a destination schedule selecting means for selecting a plurality of the processing schedules, other than the source processing schedule, to be destination schedules; and a copying means for simultaneously copying, within said storage means, the values of the processing conditions of the source processing schedule to be the values of corresponding processing conditions of each destination schedule.

4. A laser beam processing programming unit operable to input processing conditions, contained in a plurality of processing schedules, into a laser beam processing controller through the use of a communications interface, said programming unit comprising:

a display means for displaying a screen cursor and the processing conditions;

a cursor key means for moving the screen cursor displayed on said display means;

a data input key means for inputting values of processing conditions designated by the screen cursor;

a storage means for storing the values of the processing condition for each processing schedule;

a source schedule selecting means for selecting one of the plurality of processing schedules to be a source processing schedule;

a destination schedule selecting means for selecting a plurality of the processing schedules, other than the source processing schedule, to be destination schedules; and a copying means for simultaneously copying, within said storage means, the values of the processing conditions of the source processing schedule to be the values of corresponding processing conditions of each destination schedule.

5. A resistance welding controller operable to control resistance welding in accordance with a plurality of welding schedules which contain welding conditions, said controller comprising:

an input means for inputting values of the welding conditions for each welding schedule;

a storage means for storing the values of the welding conditions for each welding schedule;

a source schedule selecting means for selecting one of the plurality of welding schedules to be a source welding schedule;

a welding condition selecting means for selecting at least one of the welding conditions of the source welding schedule;

a destination schedule selecting means for selecting at least one of the welding schedules, other than the source welding schedule, to be destination schedules; and a copying means for copying, within said storage means, the values of the welding conditions selected from the source welding schedule, by said welding condition selecting means, to be the values of corresponding welding conditions of each destination schedule.

6. A resistance welding programming unit operable to input welding conditions, contained in a plurality of welding schedules, into a resistance welding controller through the use of a communications interface, said programming unit comprising:

a display means for displaying a screen cursor and the welding conditions;

a cursor key means for moving the screen cursor displayed on said display means;

a data input key means for inputting values of welding conditions designated by the screen cursor;

a storage means for storing the values of the welding conditions for each welding schedule;

a source schedule selecting means for selecting one of the plurality of welding schedules to be a source welding schedule;

a welding condition selecting means for selecting at least one of the welding conditions of the source welding schedule;

a destination schedule selecting means for selecting at least one of the welding schedules, other than the source welding schedule, to be destination schedules; and a copying means for copying, within said storage means, the values of the welding conditions selected from the source welding schedule, by said welding condition selecting means, to be the values of corresponding welding conditions of each destination schedule.

7. A laser beam processing controller operable to control processing of a laser beam in accordance with a plurality of processing schedules which contain processing conditions, said controller comprising:

an input means for inputting values of the processing conditions for each processing schedule;

a storage means for storing the values of the processing conditions for each processing schedule;

a source schedule selecting means for selecting one of the plurality of processing schedules to be a source processing schedule;

a processing condition selecting means for selecting at least one of the processing conditions of the source processing schedule;

a destination schedule selecting means for selecting at least one of the processing schedules, other than the source processing schedule, to be destination schedules; and a copying means for copying, within said storage means, the values of the processing conditions selected from the source processing schedule, by said processing condition selecting means, to be the values of corresponding processing conditions of each destination schedule.

8. A laser beam processing programming unit operable to input processing conditions, contained in a plurality of processing schedules, into a laser beam processing controller through the use of a communications interface, said programming unit comprising:

a display means for displaying a screen cursor and the processing conditions;

a cursor key means for moving the screen cursor displayed on said display means;

a data input key means for inputting values of processing conditions designated by the screen cursor;

a storage means for storing the values of the processing condition for each processing schedule;

a source schedule selecting means for selecting one of the plurality of processing schedules to be a source processing schedule;

a processing condition selecting means for selecting at least one of the processing conditions of the source processing schedule;

a destination schedule selecting means for selecting at least one of the processing schedules, other than the source processing schedule, to be destination schedules; and a copying means for copying, within said storage means, the values of the processing conditions selected from the source processing schedule, by said processing condition selecting means, to be the values of corresponding processing conditions of each destination schedule.

\* \* \* \* \*